(12) United States Patent
Sharpe, Jr.

(10) Patent No.: US 6,392,559 B1
(45) Date of Patent: *May 21, 2002

(54) UNDERBODY AND ADJACENT LIGHTING FOR AUTOMOTIVE VEHICLE

(75) Inventor: Emanuel M. Sharpe, Jr., West Bloomfield, MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/769,037

(22) Filed: Dec. 18, 1996

Related U.S. Application Data

(63) Continuation of application No. 08/534,429, filed on Sep. 27, 1995.

(51) Int. Cl.[7] ............................................. G08C 19/00
(52) U.S. Cl. ..................... 340/825.72; 340/825.69; 340/425.5; 340/426; 362/495; 362/544
(58) Field of Search .................. 362/80, 81, 82, 362/83, 83.3, 276, 802, 494, 542; 340/825.72, 825.69, 426, 425.5, 825.32, 475

(56) References Cited

U.S. PATENT DOCUMENTS

| | | | | |
|---|---|---|---|---|
| 2,010,374 A | * | 8/1935 | Pissis | 362/495 |
| 2,036,435 A | * | 4/1936 | Phelps | 362/81 |
| 4,809,137 A | | 2/1989 | Yamada | 362/61 |
| 4,866,417 A | * | 9/1989 | DeFino et al. | 340/429 |
| 5,017,903 A | * | 5/1991 | Krippelz, Sr. | 362/80 |
| 5,036,437 A | * | 7/1991 | Macks | 362/276 |
| 5,174,643 A | * | 12/1992 | Priesemuth | 362/276 |
| 5,209,559 A | * | 5/1993 | Ruppel | 362/80 |
| 5,278,547 A | | 1/1994 | Suman et al. | 340/825.32 |
| 5,321,588 A | | 6/1994 | Weddemann et al. | 362/61 |
| 5,371,659 A | | 12/1994 | Pastrick et al. | 362/83.1 |
| 5,406,171 A | * | 4/1995 | Moody | 362/80 |
| 5,917,405 A | * | 6/1999 | Joao | 340/426 |
| 6,149,287 A | * | 11/2000 | Pastrick et al. | 362/494 |

* cited by examiner

Primary Examiner—Brian Zimmerman
Assistant Examiner—Yves Dalencourt
(74) Attorney, Agent, or Firm—Jennifer Stec

(57) ABSTRACT

A lighting system for illuminating the exterior of an automotive vehicle has a remotely controlled lamp or set of lamps mounted to the underside of the vehicle for providing illumination both below the vehicle and under the vehicle when the vehicle is stationary the lamps illuminate upon receipt of a predetermined signal from a transmitter. The lamps may also illuminate upon opening a vehicle door to illuminate the path of an exiting passenger.

20 Claims, 2 Drawing Sheets

UNDERBODY AND ADJACENT LIGHTING FOR AUTOMOTIVE VEHICLE

This is a continuation of copending application Ser. No. 08/534,429 filed Sep. 27, 1995.

BACKGROUND OF THE INVENTION

The present invention relates to an exterior lighting system for an automotive vehicle. More particularly, the invention relates to security lights for illuminating an area under and adjacent to the vehicle.

It is desirable for an area around a vehicle to be illuminated when the ambient light is low. U.S. Pat. No. 5,371,659 describes an exterior vehicle security light mounted in the exterior rearview mirror. The light shines on an area adjacent the vehicle. This approach has several disadvantages. One disadvantage is that significant shadows are formed under the vehicle. Another disadvantage is that the light moves with the vehicle door to which the mirror is mounted.

Certain vehicles such as sport utility vehicles have a greater ground clearance which if illumination where attempted using a mirror mounted light such as that described in the '659 patent, would cause significant shadows under the vehicle.

SUMMARY OF THE INVENTION

One advantage of the present invention is that complete vehicle illumination is provided by illuminating an area adjacent to the vehicle as well as under the vehicle.

The present invention includes a transmitter for transmitting a predetermined code and a receiver mounted in the vehicle for receiving the predetermined code. A lamp is mounted to the underside of the vehicle. The light directly illuminates both an area adjacent to and underneath the vehicle. A controller connected to the receiver and the lamp, activates the lamp in response to the receiver receiving a predetermined transmission.

DETAILED DESCRIPTION OF THE PREFERRED EMBODIMENT

Figure 1:
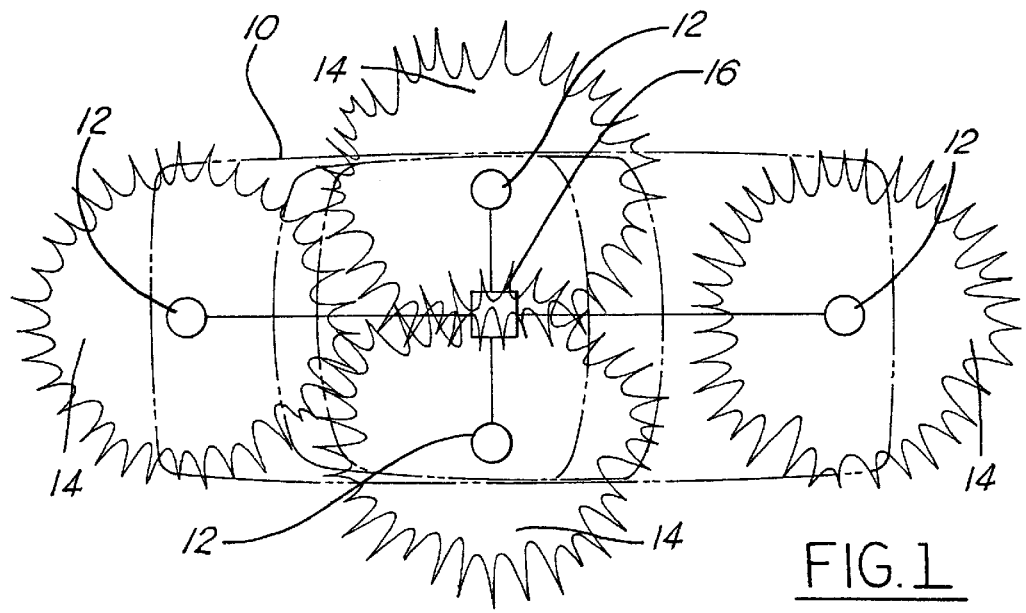
FIG. 1 is a top view of an automotive vehicle having a lighting system according to the present invention.

Referring to FIG. 1, an automotive vehicle 10 has a lighting system for illuminating under the vehicle as well as areas adjacent the vehicle. The lighting system has a number of lamps 12 mounted under vehicle 10 each of which generate a predetermined light pattern 14. Light patterns 14 combine to fully illuminate under the vehicle as well as an area directly adjacent to and completely around vehicle 10. Lamps 12 are preferably centrally controlled by a controller 16 as further described below.

Lamps 12 are of the type specifically designed for automotive applications such as that manufactured by Grote Industries of Madison, Ind. Lamps 12 are preferably weatherproof and shock proof so that they may withstand the extreme environmental conditions experienced during the lifetime of a vehicle.

Lamps 12 are preferably located in front, behind and to each side of vehicle 10. Illuminating at least to the sides of the vehicle is the most desirable.

Figure 2:
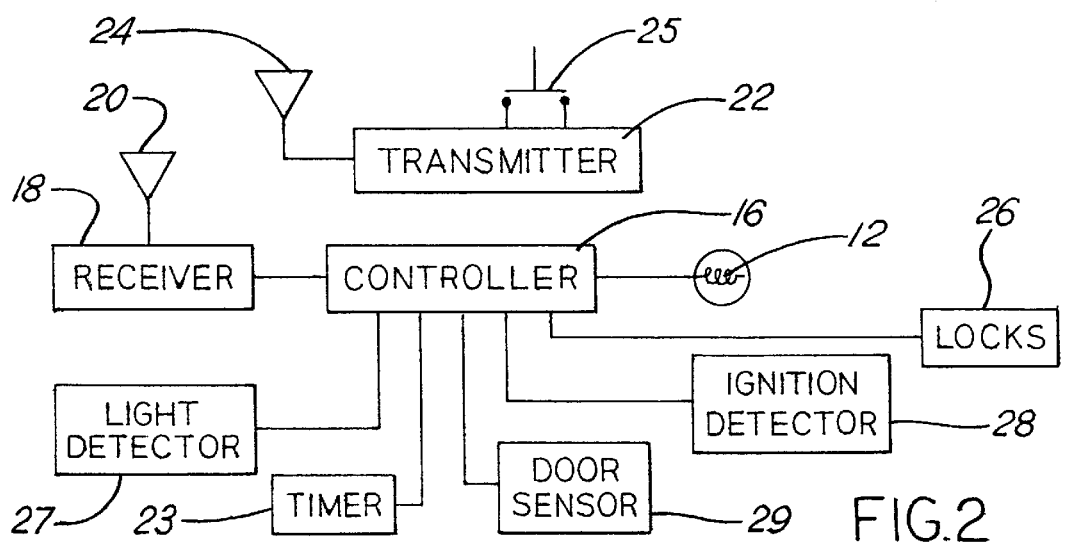
FIG. 2 is a block diagram of the present invention.

Referring now to FIG. 2, the under-vehicle lighting system is most effective when incorporated with a remote control system so that the lighting system may be illuminated while approaching the vehicle. Controller 16 is connected to a receiver 18 with a receiving antenna 20. Receiver 18 is used to receive a transmitted signal from a transmitter 22 having a transmitting antenna 24. Controller 16 may also be used to control the operation of the locks of the doors of vehicle 10.

A timer 23 may be used to deactivate lamps after a predetermined time. Such a function will prevent the vehicle battery from discharging upon inadvertent operation of lamps 12. As an example, the predetermined time may be about one minute.

Transmitter 22 generates a coded signal via antenna 24. The coded signal is preferably an RF signal. However, several variations may be substituted. For example, infrared using an LED rather than an antenna may be used. Transmitter 22 has a push button 25 for controlling the transmission of the coded signal. Transmitter 22 may have several buttons for signaling several functions. Lamps 12 are preferably operated in conjunction with power locks 26 so that when push button 25 is operated to unlock power locks 26, the lamps also illuminate.

Receiver 18 receives the coded signal and converts the coded signal into a form usable by controller 16 such as a digital signal. Controller 16 compares the received coded signal to a valid coded signal stored within receiver 18. If the received coded signal is recognized as a valid signal, controller 16 enables the operation of the lighting system and any other function such as the unlocking of a door.

Controller 16 may also have a light detector 27 which will disable the lighting system when sufficient ambient light is available. Such light detectors are currently used in vehicles to control the operation of automatic headlamps.

Controller 16 may also have the function of preventing lamps 12 from being activated while the vehicle is running. An ignition detector 28 senses when the ignition is in the "on" position and provides feedback to controller 16 to that effect. Controller 16 upon receiving the ignition "on" signal deactivates lamps 12.

Controller 16 may also have the function of illuminating lamps 12 upon the opening of the vehicle doors. A door open detector 29 senses when the doors are opened and provides feedback to controller 16 to that effect. Controller 16 may control lamps 12 in response to the door opening when the car is stationary. A motion detector may be used. Also, the vehicle is typically stationary when the transmission of the car is in neutral or park. Lamps 12 will illuminate the area around the vehicle where the passengers will be exiting the vehicle. The present invention provides superior results to that of mirror mounted lighting methods, since in prior methods the mirror moves with the door, direct illumination of the area where the passengers are about to exit the vehicle is not possible.

Figures 3A, 3B:
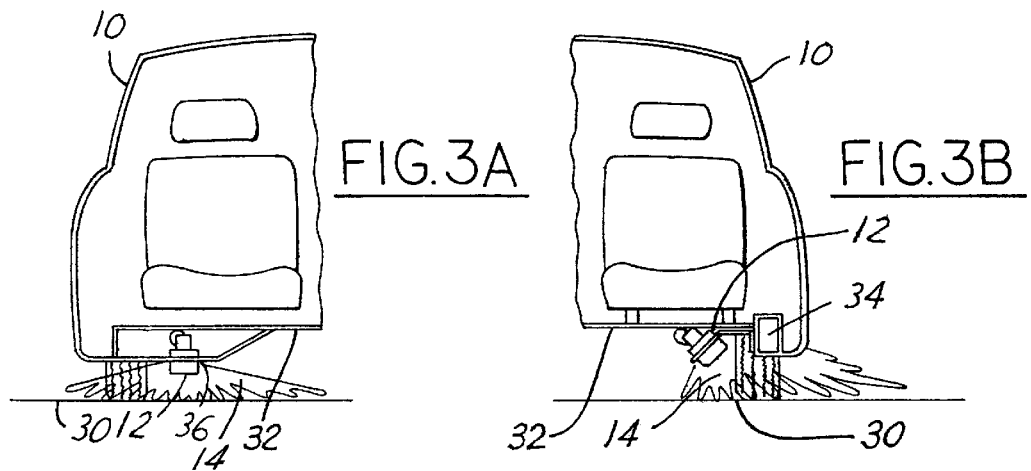
FIG. 3a is a cross sectional view of a frame-type vehicle with lights mounted according to the present invention.
FIG. 3b is a cross sectional view of a unibody type vehicle with lights mounted according to the present invention.

Referring now to FIGS. 3A and 3B, a cross section of vehicle 10 on a horizontal road plane 30 shows more detail of the mounting of a lamps 12. Vehicle 10 has an underside 32 to which lamps 12 are preferably mounted. Underside 32 is generally planar and parallel to road plane 30. Vehicle 10 may be either of frame construction or of the unibody type.

Referring to FIG. 3B, if the vehicle is frame construction, lamps 12 may be mounted to a frame member 34.

Referring to FIG. 3A, if the vehicle construction is unibody the preferred mounting method is mounting lamp 12 within an opening 36 in the underside of vehicle 10.

Lamps 12 are oriented to disperse light under the vehicle as well as adjacent to vehicle 10. Lamps 12 may be mounted at an angle with respect to road plane 30 or parallel with road plane 30 as long as the light from lamps 12 is directed under and adjacent to vehicle 10 as is shown by light pattern 14.

Figure 4:
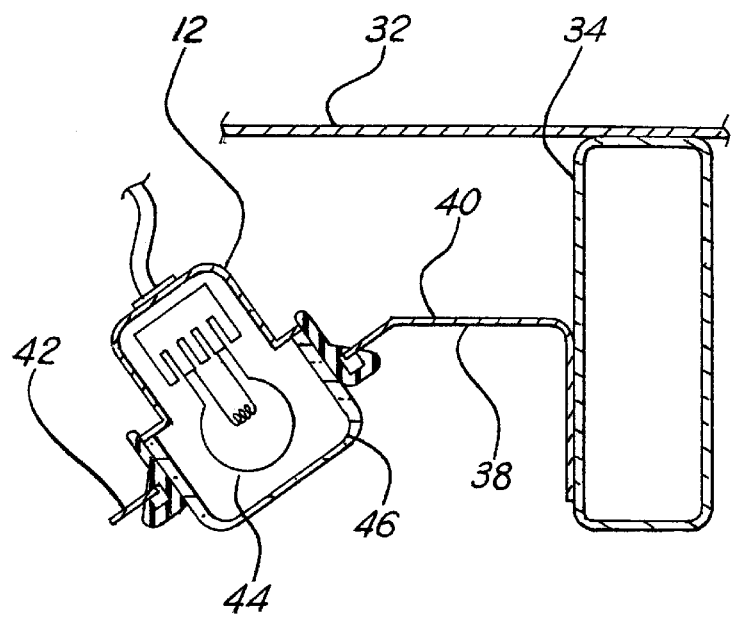
FIG. 4 is a detailed cross sectional view of a lamp mounted on a bracket in a frame type vehicle.

Referring now to FIG. 4, a more detailed mounting of a lamp 12 to a frame member 34 is shown. A bracket 38 is used to secure lamp to frame member 34 on underside 32 of the vehicle in a canted relationship to the horizontal road plane. Bracket 38 has a horizontal portion 40 and an angled portion 42 with respect to the horizontal road plane. Bracket 38 is preferably welded to frame member 34. Angled portion 42 ensures light generated by lamp 12 illuminates an area under the vehicle and adjacent to the vehicle.

Lamp 12 has a light source 44 electrically connected to the controller. Light source 44 preferably illuminates the area with a high intensity white light so that visibility is maximized by the light generated.

Figure 5:
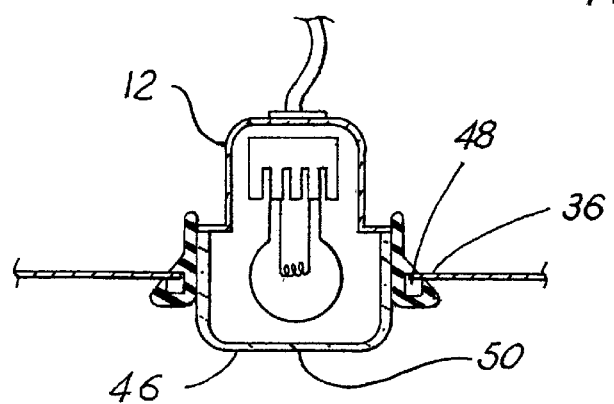
FIG. 5 is a detailed cross sectional view of a lamp mounted in an opening of a unibody type vehicle.

Referring now to FIG. 5, a lamp 12 is shown mounted in an opening 36 of underside 32 and sealed with a gasket 48 to prevent moisture from entering the vehicle. In this configuration lamp 12 may be mounted in a direction parallel with road plane 30. In such an orientation, a lens 46 having spreading and bending optics 50 may be used to spread light under the vehicle as well as adjacent to the vehicle. Such a configuration is desirable for a vehicle having unibody construction.

As would be evident to one skilled in the art, several modifications of the invention may be made while still being within the scope of the appended claims. For example, the transmitter may continuously generate a passive entry. Also, if the vehicle is a sport/utility vehicle lamps may be mounted on the underside of running boards located on the sides of the vehicle.

What is claimed is:

1. An exterior lighting system for an automotive vehicle having an underside, a right side, a left side, a front and a rear and a plurality of doors, comprising:
   a wireless, remote control transmitter positionable at locations exterior of the vehicle for generating a predetermined transmission;
   a receiver mounted in the vehicle for receiving said predetermined transmission from said locations exterior of the vehicle;
   a lamp mounted an said underside of the vehicle, said lamp positioned so as to direct light in a substantially downward direction when activated so as to provide direct illumination of substantially the entire area underneath the vehicle; and
   a controller connected to said receiver and said lamp, said controller activating said lamp in response to said receiver receiving the said predetermined transmission from said wireless remote control transmitter.

2. An exterior lighting system as recited in claim 1 wherein said controller deactivates said lamps if said vehicle is running.

3. An exterior lighting system as recited in claim 1 wherein said underside comprising a frame member, said light supported by a bracket mounted to said frame member.

4. An exterior lighting system as recited in claim 1 wherein said underside having at least one opening for mounting at least one of said lamps within said opening.

5. An exterior lighting system as recited in claim 1 wherein said controller activating said lamps upon opening of one of said doors.

6. An exterior lighting system for an automotive vehicle having a front, back, right, and left sides, an underside, and a plurality of doors, comprising:
   a wireless, remote control transmitter positionable at locations exterior of the vehicle and having an antenna for generating a predetermined transmission and transmitting said predetermined transmission through said antenna;
   a receiver mounted in said vehicle and having an antenna cooperating with said of the vehicle;
   a plurality of lamps mounted on said underside of the vehicle, said lamps position so as to direct light in a substantially downward direction when activated so as provide direct illumination of substantially the entire area underneath the vehicle; and
   a controller connected to said receiver and said lamp, said controller activating said lamps in response to receiving said predetermined transmission from said wireless, remote control transmitter.

7. An exterior lighting system as recited in claim 6 wherein said controller deactivates said lamps if said vehicle is running.

8. An exterior lighting system as recited in claim 6 wherein said underside comprising a frame member, said light mounted to a bracket mounted to said frame member.

9. An exterior lighting system as recited in claim 6 wherein said underside having at least one opening for mounting at least one of said lamps within said opening.

10. An exterior highting system as recited in claim 6 wherein said controller activating said lamps upon opening of one of said doors.

11. An exterior lighting system for an automotive vehicle having a front, back, right, and left side, an underside and a plurality of doors, comprising:
    a wireless, remote control transmitter positionable at locations exterior of the vehicle and having a manually actuatable switch, with the said wireless, remote control transmitter transmitting a predetermined transmission when said switch is manually actuated;
    a receiving mounted in the vehicle for receiving said predetermined transmission from said locations exterior of the vehicle;
    a lamp mounted on said underside of the vehicle, said lamp positioned so as to direct light in a substantially downward direction when activated so as to provide direct illumination of substantially the entire area underneath the vehicle; and
    a controller connected to said receiver and said lamp, said controller activating said lamp in response to said receiver receiving said predetermined transmission from said wireless remote control transmitter such that said area under the vehicle is illuminated when said switch on said wireless remote control transmitter is manually actuated.

12. An exterior lighting system as recited in claim 11 wherein said underside comprising a frame member, said light mounted on a bracket mounted to said frame member.

13. An exterior lighting system as recited in claim 11 wherein said controller deactivates said lamps if said vehicle is running.

14. An exterior lighting system as recited in claim 11 wherein said underside having at least one opening within said underside for mounting said lamp within said opening.

15. An exterior lighting system as recited in claim 11 wherein said lamp illuminates said right and left sides of said vehicle.

16. An exterior lighting system as recited in claim 1 wherein said wireless, remote control transmitter comprises a transmission antenna and wherein said receiver comprises a receiving antenna, with said receiving antenna cooperating with said transmitting antenna for receiving said predetermined transmission.

17. An exterior lighting system as recited in claim 16 wherein said predetermined transmission is an RF signal.

18. An exterior lighting system as recited in claim 1 wherein said predetermined transmission is an infrared light signal.

19. An exterior lighting system as recited in claim 6 wherein said predetermined transmission is an RF signal.

20. An exterior lighting system as recited in claim 6 wherein the plurality of lamps comprises a first lamp mounted under the front of the vehicle, a second lamp mounted under the back of the vehicle, a third lamp mounted under the left side of the vehicle and a fourth lamp mounted under the right side of the vehicle.

* * * * *